United States Patent [19]

Sawase et al.

[11] Patent Number: 5,415,598

[45] Date of Patent: May 16, 1995

[54] VEHICULAR LEFT/RIGHT DRIVE TORQUE ADJUSTING APPARATUS

[75] Inventors: Kaoru Sawase, Anjo; Takahisa Niwa, Nagoya, both of Japan

[73] Assignee: Mitsubishi Jidosha Kogyo Kabushiki Kaisha, Tokyo, Japan

[21] Appl. No.: 76,788

[22] Filed: Jun. 15, 1993

[30] Foreign Application Priority Data

Jun. 15, 1992 [JP] Japan .................. 4-155427

[51] Int. Cl.$^6$ .................. F16H 1/38; F16H 57/02
[52] U.S. Cl. .................. 475/86; 475/248; 475/150; 475/249; 74/606 R
[58] Field of Search .......... 475/84, 86, 89, 220, 475/225, 248, 249, 150; 74/606 R

[56] References Cited

U.S. PATENT DOCUMENTS

| | | | |
|---|---|---|---|
| 3,828,877 | 8/1974 | Fogelberg | 475/249 X |
| 4,589,304 | 5/1986 | Ashikawa et al. | 475/249 X |
| 4,612,824 | 9/1986 | Ruhle | 475/249 X |
| 4,779,699 | 10/1988 | Hatano | 475/249 X |
| 4,819,506 | 4/1989 | Matsumoto | 475/249 X |
| 4,973,296 | 11/1990 | Shibahata | 475/225 X |
| 5,083,635 | 1/1992 | Tashiro | 475/86 X |
| 5,135,071 | 8/1992 | Shibahata et al. | |
| 5,246,408 | 9/1993 | Kobayashi | 475/249 X |

FOREIGN PATENT DOCUMENTS

| | | |
|---|---|---|
| 0248582 | 12/1987 | European Pat. Off. . |
| 4000667 | 7/1990 | Germany . |
| 2213443 | 8/1989 | United Kingdom . |
| 9307017 | 4/1993 | WIPO . |

OTHER PUBLICATIONS

Japanese Abstract JP2221743, Apr. 9, 1990 Kawamoto Mutsumi.

*Primary Examiner*—Edward K. Look
*Assistant Examiner*—John Ryznic

[57] ABSTRACT

A speed increasing/decreasing mechanism is interposed between a left-wheel axle and a right-wheel axle. The mechanism is constructed integrally of a speed increasing mechanism and a speed decreasing mechanism. The speed increasing mechanism is adapted to increase a rotational speed of the left-wheel axle and then to output the thus-increased rotational speed to a first intermediate axle. The speed decreasing mechanism, on the other hand, is adapted to decrease a rotational speed of the left-wheel axle and then to output the thus-decreased rotational speed to a second intermediate axle. A first coupling of the variable transmitted torque capacity type is interposed between the first intermediate axle and the right-wheel axle to transmit drive torque therebetween. A second coupling of the variable transmitted torque capacity type is interposed between the second intermediate axle and the right-wheel axle to transmit drive torque therebetween.

11 Claims, 7 Drawing Sheets

# VEHICULAR LEFT/RIGHT DRIVE TORQUE ADJUSTING APPARATUS

BACKGROUND OF THE INVENTION

1. Field of the Invention

This invention relates to a vehicular left/right drive torque adjusting apparatus suitable for use in the distribution of drive torque to the left and right wheels in a four-wheel-drive or two-wheel-drive automotive vehicle.

2. Description of the Related Art

Recent years have seen major developments in four-wheel-drive (hereinafter called "4WD") automotive vehicles, including a variety for full-time 4WD automotive vehicles where improvements include positive adjustment of the division of torque (drive torque) between front and rear wheels.

When two members which are rotating at different rotational speeds are coupled together, the difference in their rotational speeds is generally reduced and torque is usually transferred from the side of the member rotating at the higher speed to the side of the member rotating at the lower speed. Differential-limiting, front/rear torque distribution apparatuses making use of these characteristics have been proposed.

Distribution of torque between the front and rear wheels can be adjusted, for example, by providing a center differential, which is arranged between the front wheels and the rear wheels, with a differential limiting mechanism of the frictional engagement type to limit differential motion (a difference in rotational speed) between the front and rear wheels and controlling the state of engagement of the differential limiting mechanism. As the differential limiting mechanism, a hydraulic multi-plate clutch, use of an electromagnetic clutch or the like can be considered. When a hydraulic multi-plate clutch is used, the state of engagement of the hydraulic multi-plate clutch, that is, of the differential limiting mechanism can be controlled by adjusting the position of a hydraulic pressure control valve in accordance with a computer or the like.

Taking in a broad sense a mechanism for distributing torque to left and right wheels in an automotive vehicle, on the other hand, it is considered to include conventional normal differentials as well as LSDs (limited slip differentials) including those of the electronic control type. They however do not positively adjust the distribution of torque, so that they cannot distribute torque between left and right wheels as desired.

Therefore it is also desired to develop an apparatus capable of adjusting the distribution of torque between the left and right wheels in addition to an apparatus for permitting adjustment of the distribution of torque between the front and rear wheels. In this case, the left/right torque distribution adjusting apparatus is intended for use in the adjustment of torque distribution not only between the left and right driving wheels in a 4WD vehicle but also between the left and right driving wheels in a 2WD vehicle such as a front wheel drive vehicle or a rear wheel drive vehicle.

Incidentally, it is desired for a torque distribution mechanism that the distribution of torque can be effected as desired without inducing any large torque loss or energy loss. It is also desired to reduce the size and weight of the mechanism as much as possible.

SUMMARY OF THE INVENTION

A first object of this invention is to provide a vehicular left/right drive torque adjusting apparatus which has higher practical utility and exhibits high performance.

Describing this object specifically, specific objects of this invention include (i) to permit the distribution of torque between left and right wheels without inducing any substantial torque loss or energy loss, (ii) to reduce the size and weight of the apparatus, (iii) to improve the responsibility to control, (iv) to facilitate the maintenance of the apparatus, and (v) to permit easy assembly without failure.

To achieve such specific objects, the present invention provides, in one aspect, a vehicular left/right drive torque adjusting apparatus having, between a left-wheel axle and a right-wheel axle in a vehicle, input means for receiving drive torque from an engine, a differential mechanism for transmitting drive torque, which has been inputted from said input means, to the left-wheel axle and the right-wheel axle while permitting differential motion between the left-wheel axle and the right-wheel axle, and a drive torque transmission control mechanism for controlling the state of transmission of the drive torque to permit adjustment of the distribution of the drive torque to the left and right wheels. The drive torque transmission control mechanism comprises:

a speed increasing/decreasing mechanism interposed between the left-wheel axle and the right-wheel axle and constructed integrally of a speed increasing mechanism and a speed decreasing mechanism, said speed increasing mechanism being adapted to increase a rotational speed of one of the axles and then to output the thus-increased rotational speed to a first intermediate axle, and said speed decreasing mechanism being adapted to decrease a rotational speed of said one axle and then to output the thus-decreased rotational speed to a second intermediate axle;

a first coupling of the variable transmitted torque capacity type interposed between the first intermediate axle and the other axle and adapted to transmit drive torque between the first intermediate axle and the other axle; and a second coupling of the variable transmitted torque capacity type interposed between the second intermediate axle and the other axle and adapted to transmit drive torque between the second intermediate axle and the other axle.

In a preferred embodiment, the first and second couplings of the variable transmitted torque capacity type are adjacent to each other and are integrally constructed as an integral coupling. The differential mechanism, the speed increasing/decreasing mechanism and the integral couplings can be arranged coaxially.

In the preferred embodiment, the first and second couplings of the variable transmitted torque capacity type can be constructed as electrically-controlled, hydraulic multi-plate clutches, respectively. The electrically-controlled, hydraulic multi-plate clutches can desirably be integrated in series to form the integral coupling.

In the preferred embodiment, the integral coupling can be disposed with a partition interposed between the integral coupling and the differential mechanism and speed increasing/decreasing mechanism.

In the preferred embodiment, the differential mechanism can be constructed preferably of a planetary differential mechanism. The planetary differential mechanism can comprise a ring gear, a planetary carrier and a sun gear, the ring gear is connected to said input means so that the ring gear can integrally rotate with said input means, the planetary carrier can be connected to one of the axles so that the planetary carrier can integrally rotate with the one axle, the sun gear can be connected to the other axle so that the sun gear can integrally rotate with the other axle, the one axle and the other axle can be coaxially arranged on left and right sides of the planetary differential mechanism, respectively, the speed increasing/decreasing mechanism can be arranged on the side of the other axle, and the integral coupling can be arranged outside the speed increasing-/decreasing mechanism on the side of the other axle. If desired, a third intermediate axle may be interposed between the one axle and the speed increasing/decreasing mechanism to connect the one axle and the speed increasing/decreasing mechanism to each other via the third intermediate axle, the speed increasing mechanism of the speed increasing/decreasing mechanism may be constructed of a gear mechanism interposed between the third intermediate axle and the first intermediate axle, and the speed decreasing mechanism of the speed increasing/decreasing mechanism may be constructed of a gear mechanism interposed between the third intermediate axle and the second intermediate axle.

In the apparatus according to the one aspect of this invention, the speed increasing/decreasing mechanism can be constructed of a compound planetary gear mechanism in which an input sun gear integrally rotatable with a third axle, a first output sun gear integrally rotatable with the first intermediate axle, a second output sun gear integrally rotatable with the second intermediate axle, an input planetary gear rotatable in mesh with the input sun gear, and a first output planetary gear rotatable in mesh with the first output sun gear and a second output planetary gear rotatable in mesh with the second output sun gear are integrally connected together. Preferably, the first and second couplings of the variable transmitted torque capacity type can be adjacent to each other and can be integrally constructed as an integral coupling, and the differential mechanism, the speed increasing/decreasing mechanism and the integral couplings can be arranged coaxially.

In the apparatus according to the one aspect of this invention, the differential mechanism and the speed increasing/decreasing mechanism can be accommodated within a differential carrier so that the differential mechanism and the speed increasing/decreasing mechanism are isolated from each other by a partition.

In the apparatus according to the one aspect of this invention, the input means and the speed increasing/decreasing mechanism can desirably be arranged substantially along an imaginary base line which extends in a front-to-rear direction of the vehicle, and the differential mechanism can be arranged on one side of the imaginary base line, and the first and second couplings of the variable transmitted torque capacity type can be arranged on the opposite side of the imaginary base line.

DESCRIPTION OF THE PREFERRED EMBODIMENTS

The vehicular left/right drive torque adjusting apparatus according to one embodiment of the present invention is installed at the part of a rear differential of an automotive vehicle to perform left-to-right or right-to-left transfer of drive torque between rear wheels. In the illustrated embodiment, especially, the apparatus is disposed on a side of the rear wheels of a 4WD vehicle drive torque outputted to the side of the rear wheels via a center differential is received by an input shaft via a drive shaft, whereby the drive torque can be distributed rightwards and leftwards.

Figure 7:
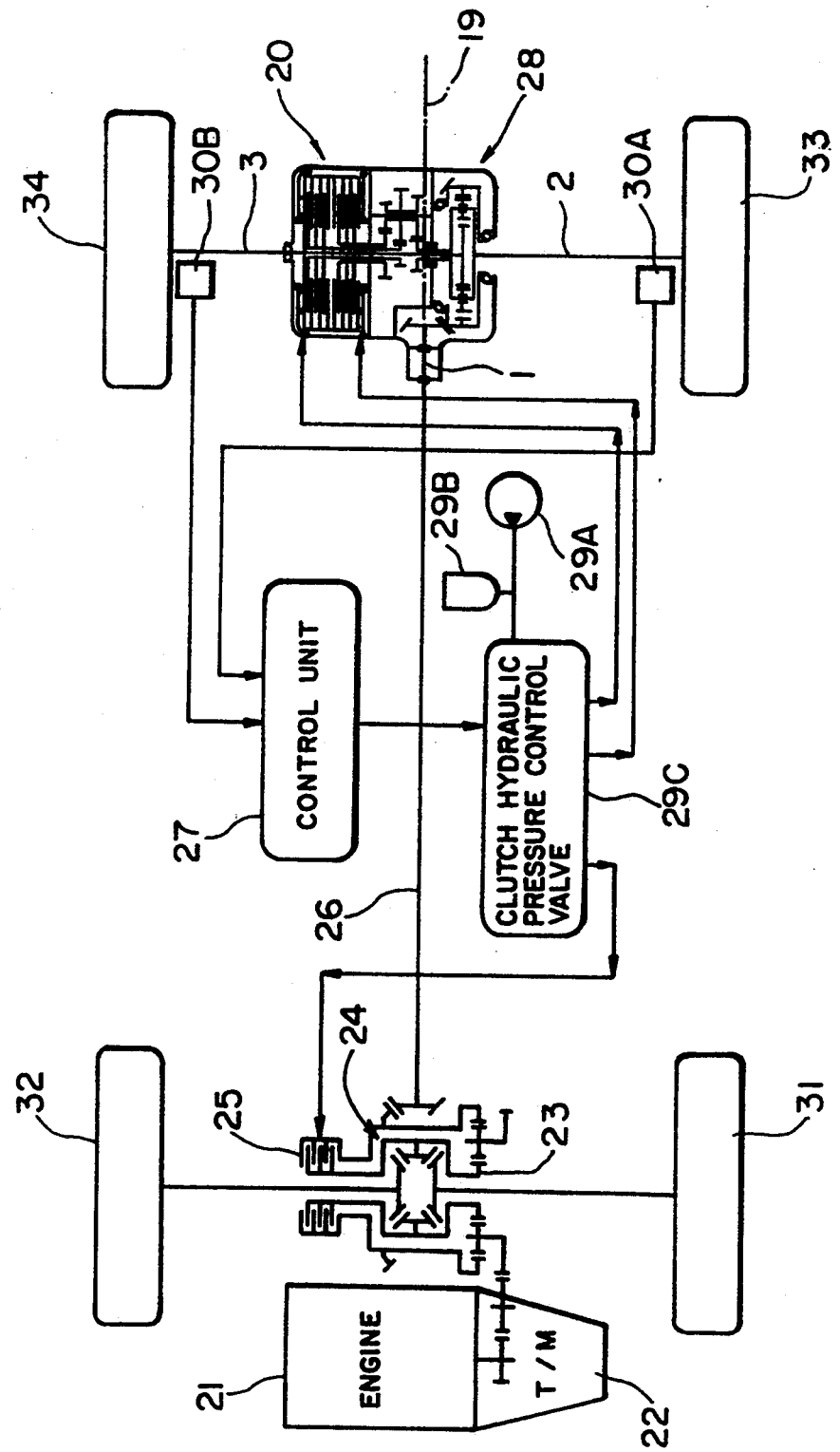
FIG. 7 is a simplified block diagram illustrating a drive torque transmission system in a vehicle equipped with the vehicular left/right drive torque adjusting apparatus according to one embodiment of the present invention.

A description will first be made of the overall construction of the drive system of the vehicle equipped with the apparatus. As is illustrated in FIG. 7, drive torque from an engine 21 is received by a center differential 23, which is constructed of planetary gears, via a transmission 22. The drive torque is then transmitted from the center differential 23 to a front wheel side and also to a rear wheel side.

The center differential 23 is provided with a known differential limiting device 25 which can suitably limit differential motion between front wheels 31,32 and rear wheels 33,34. In this embodiment, the differential limiting device 25 is constructed of a hydraulic multi-plate clutch and is designed to be able to control the distribution of drive torque to the front and rear wheels while limiting differential motion between the front and rear wheels in accordance with hydraulic pressure supplied, so that the differential limiting device 25 serves as a device for controlling the distribution of drive torque between the front and rear wheels.

One of amounts of drive torque divided by the center differential 23 as described above is transmitted to the left and right front wheels 31,32 via a front differential 24. On the other hand, the other amount of drive torque distributed from the center differential 23 is transmitted to a rear differential unit 28 via a drive shaft 26 and is then transmitted to the left and right rear wheels 33,34 by way of the rear differential unit 28.

Constructed in the rear differential unit 28 is the vehicular left/right drive torque adjusting apparatus according to one embodiment of the present invention, as designated at numeral 20. As is shown in detail in FIGS. 1 and 2, the vehicular left/right drive torque adjusting apparatus 20 is constructed of a rear differential 4 and a drive torque transmission control mechanism 5 disposed in the proximity of the rear differential 4. The drive torque transmission control mechanism 5 is in turn constructed of a speed increasing/decreasing mechanism 6 and first and second couplings 7,8 of the variable transmitted torque capacity type.

The first and second couplings 7,8 of the variable transmitted torque capacity type are hydraulic clutches. Their hydraulic system is controlled, along with a hydraulic system for the multi-plate clutch mechanism 25 of the above-described front/rear drive torque adjusting apparatus, by a control unit 27 as control means.

Namely, the hydraulic system for the first and second couplings 7,8 of the variable transmitted torque capacity type and that for the multi-plate clutch mechanism 25 are composed of unillustrated hydraulic pressure compartments formed in association with the corresponding clutch mechanisms, a motor-operated pump 29A and an accumulator 29B, said pump and accumulator making up a hydraulic pressure source, and a clutch hydraulic pressure control valve 29C for feeding a hydraulic pressure of the hydraulic pressure source to the hydraulic pressure compartments in an amount as needed.

As is generally practiced in control of this type, the control unit 27 controls the opening or position of the clutch hydraulic pressure control valve 29C, for example, on the basis of information from various sensors such as wheel speed sensor 30A,30B, a steering angle sensor, a yawrate sensor and an acceleration sensor.

The vehicular left/right drive torque adjusting apparatus 20 will now be described in detail.

Figure 1:
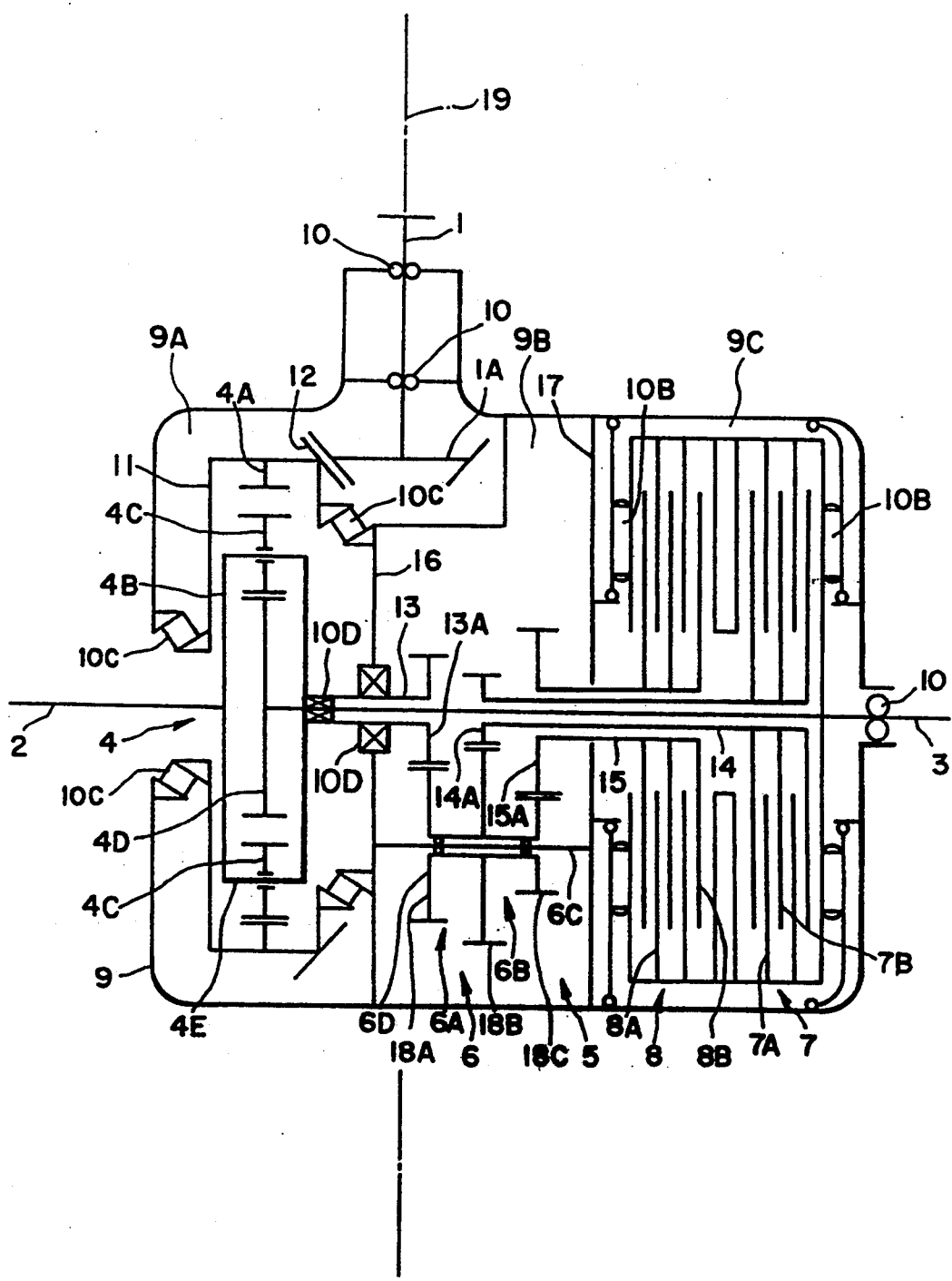
FIG. 1 is a schematic skeleton diagram showing a vehicular left/right drive torque adjusting apparatus according to one embodiment of the present invention.
Figure 2:
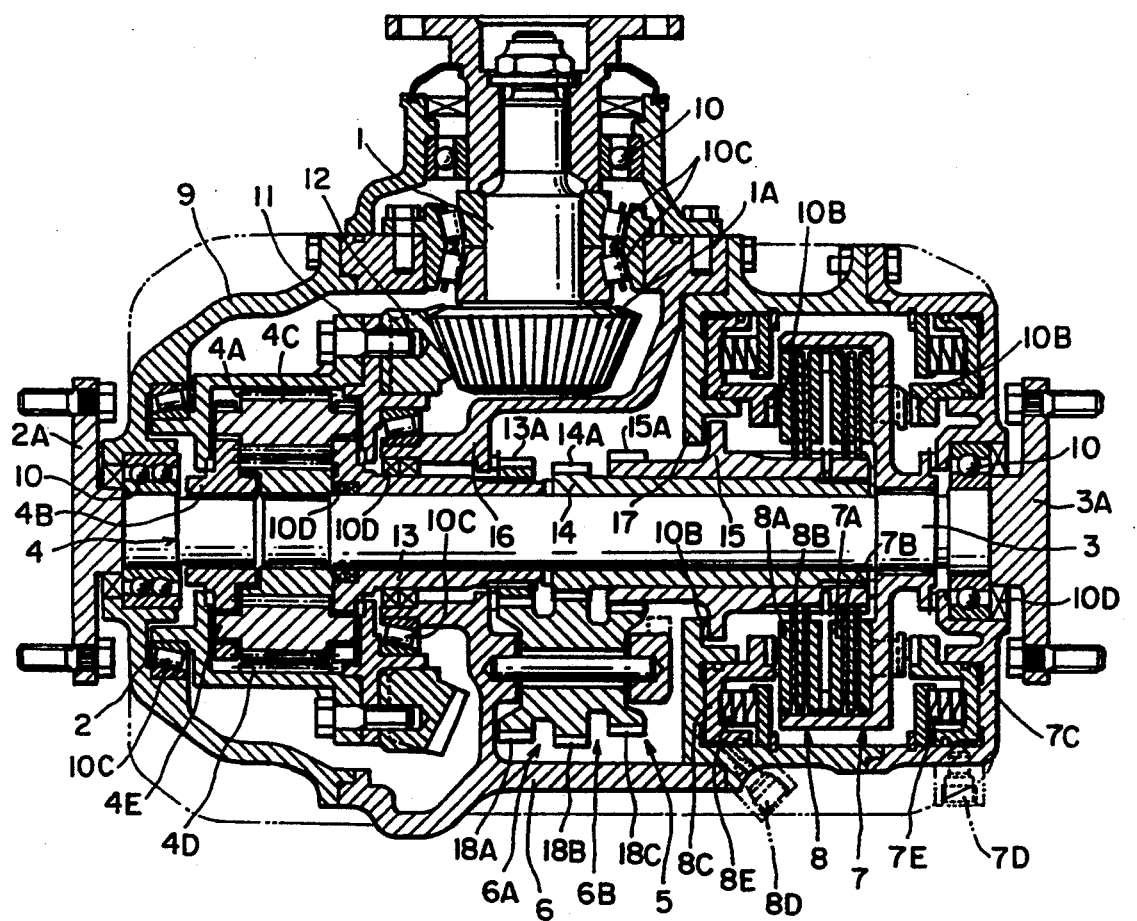
FIG. 2 is a substantially horizontal, cross-sectional view specifically illustrating the construction of the vehicular left/right drive torque adjusting apparatus according to one embodiment of the present invention.

As is illustrated in FIGS. 1 and 2, the apparatus is disposed to couple an input shaft (input means) 1, which is adapted to receive rotational drive torque distributed to the rear wheel side out of an engine output of the automotive vehicle, with left-wheel output shaft (a left-wheel axle) 2 and right-wheel output shaft (a right-wheel axle) 3, said axles 2,3 being adapted to output drive torque inputted from the input shaft 1, The apparatus is constructed of the input shaft 1, the differential mechanism (differential) 4 and the drive torque transmission control mechanism 5. Incidentally, the left-wheel axle 2 is connected at a left end thereof to a drive system for the left wheel and the right-wheel axle 3 is connected at a right end thereof to a drive system for the right wheel.

It is the drive torque transmission control mechanism that serves as the center in the apparatus. The mechanism 5 is constructed, as described above, of the speed increasing/decreasing mechanism 6, the first coupling 7 of the variable transmitted torque capacity type, and the second coupling 8 of the variable transmitted torque capacity type.

The differential mechanism 4, the speed increasing-/decreasing mechanism 6 and the couplings 7,8 are arranged on a common axis which extends in the direction of the axles, that is, in a transverse direction of the vehicle. Further, the input shaft 1 and the speed increasing/decreasing mechanism 6 are disposed substantially along an imaginary base line 19 which extends in a front-to-rear direction of the vehicle. With respect to the base line 19, the differential mechanism 4 is arranged on the left side while the first and second couplings 7,8 of the variable transmitted torque capacity are disposed on the right side. In the illustrated embodiment, the base line 19 is indicated as such a phantom that extends substantially along an axis of the drive shaft 26. The positional relationship between the differential mechanism 4 and the first and second couplings 7,8 of the variable transmitted torque capacity type can be reversed to the one illustrated in the drawings. Namely, it is possible to arrange the differential mechanism 4 on the right side and the first and second couplings 7,8 of the variable transmitted torque capacity type on the left side both with respect to the base line 19.

Although the electronically-controlled, hydraulic multi-plate clutch mechanisms 7,8 are arranged as the torque transmission mechanisms of the variable transmitted capacity control type in the illustrated embodiment, any torque transmission mechanisms can be used as the torque transmission mechanisms of the variable transmitted capacity control type as long as they can variably control the capacity of torque to be transmitted therethrough. Besides the mechanisms of this embodiment, usable mechanisms can include other multiplate clutch mechanisms such as electromagnetic multiplate clutch mechanisms and, as mechanisms other than such multi-plate clutch mechanisms, hydraulic or electromagnetic friction clutches, hydraulic or electromagnetic, controllable VCUs (viscous coupling units), hydraulic or electromagnetic, controllable HCUs (hydraulic coupling units=hydraulic couplings of the differential pump type), and still other couplings such as magnetohydrodynamic clutches or electromagnetic powder clutches.

In the case of friction clutches, those permitting adjustment of coupling force by hydraulic pressure or the like as in multi-plate clutches appear to be preferred. With such friction clutches, in particular, it seems to be desirous to arrange friction clutches, each of which can transmit torque in one direction, in desired directions (for example, in their torque-transmitting directions), respectively.

As VCUs or HCUs, those having adjustable power transmission characteristics are suited although conventional ones having fixed power transmission characteristics may also be used. For the adjustment of such coupling force or power transmission characteristics, it seems to be possible to use, besides hydraulic pressure, other drive torque such as electromagnetic force.

The couplings 7,8 of the variable transmitted torque capacity type will hereinafter be called "the couplings 7,8" for the sake of brevity.

The above elements will hereinafter be described individually in order.

The input shaft 1 is rotatably supported on a differential carrier 9 with a bearing 10 interposed therebetween. A hypoid pinion 1A is mounted on one end of the input shaft 1. The pinion 1A is rotatable in mesh with a crown gear 12 fixed on a differential case 11 so that rotation of the pinion 1A is transmitted to the differential case 11.

Arranged inside the differential case 11 is a rear differential 4 of the planetary gear type. The rear differential 4 of the planetary gear type is of the double pinion type, and is constructed of a ring gear 4A formed on an inner wall of the differential case 11, a planetary carrier 4B integrally rotatable with the left-wheel axle 2, planetary pinions 4C,4C rotatably supported on a planetary shaft 4E of the planetary carrier 4B, and a sun gear 4D integrally rotatable with the right-wheel axle 3. Incidentally, the planetary pinions 4C,4C is constructed in a pair as a double pinion.

As a consequence, rotation of the differential case 11 drives the planetary pinions 4C,4C via the ring gear 4A which integrally rotates with the differential case 11. The planetary pinions 4C,4C undergo revolution about the sun gear 4D while self-rotating about the planetary shaft 4E. Depending on the revolution, rotational force is transmitted to the left-wheel axle 2 via the planetary carrier 4B. Depending on balancing between the revolution and self-rotation, rotational force is transmitted to the right-wheel axle 3 via the sun gear 4D. The planetary pinions 4C,4C can freely change the balancing between the revolution and the self-rotation, whereby a differential mechanism has been established.

Next to the rear differential 4, the speed increasing-/decreasing mechanism 6 of the drive torque transmission control mechanism 5 is disposed.

This speed increasing/decreasing mechanism 6 is interposed between a hollow intermediate axle (third intermediate axle) 13, which is connected to the carrier 4B so that the third axle 13 can rotate integrally with the left-wheel axle 2 via the carrier 4B, and another hollow intermediate axle (first intermediate axle) 14 and a further hollow intermediate axle (second intermediate axle) 15, said first and second intermediate axles 14,15 being connected to the first and second couplings 7,8, respectively.

These intermediate axles 13,14,15 are all hollow axles. The intermediate axles 13,14 are arranged on an outer peripheral wall of the right-wheel axle 3 so that they can rotate relative to the right-wheel axle 3. The intermediate axle 15, on the other hand, is arranged on an outer peripheral wall of the intermediate axle 14 so that the intermediate axle 15 can rotate relative to the intermediate axle 14.

Namely, the intermediate axle 13 is rotatably supported between the right-wheel axle 3 and a partition 16, the intermediate axle 14 between the rightwheel axle 3 and the intermediate axle 15, and the intermediate axle 15 on the outer peripheral wall of the intermediate axle 14. As is illustrated in FIG. 1, the partition 16 and another partition 17, the latter partition being to be described subsequently herein, divide the interior of the differential carrier 9 into three spaces 9A,9B,9C. The rear differential 4 is accommodated in the space 9A, the speed increasing/decreasing mechanism 6 in the space 9B, and the first and second couplings 7,8 in the space 9C.

These intermediate axles 13,14,15 are individually supported for rotation via a compound planetary gear mechanism which will be described subsequently herein.

Between the intermediate axle 13 and the partition 16 as well as the intermediate axle 13 and the right-wheel axle 3, oil seals 10D are interposed respectively, so that the side of the rear differential 4 and the side of the speed increasing/decreasing mechanism 6 and the couplings 7,8 are divided from each other in a liquid-tight fashion.

The speed increasing/decreasing mechanism 6 is constructed of a speed increasing mechanism 6A and a speed decreasing mechanism 6B. These speed increasing mechanism 6A and speed decreasing mechanisms 6B are formed of the compound planetary gear mechanism.

Figure 3:
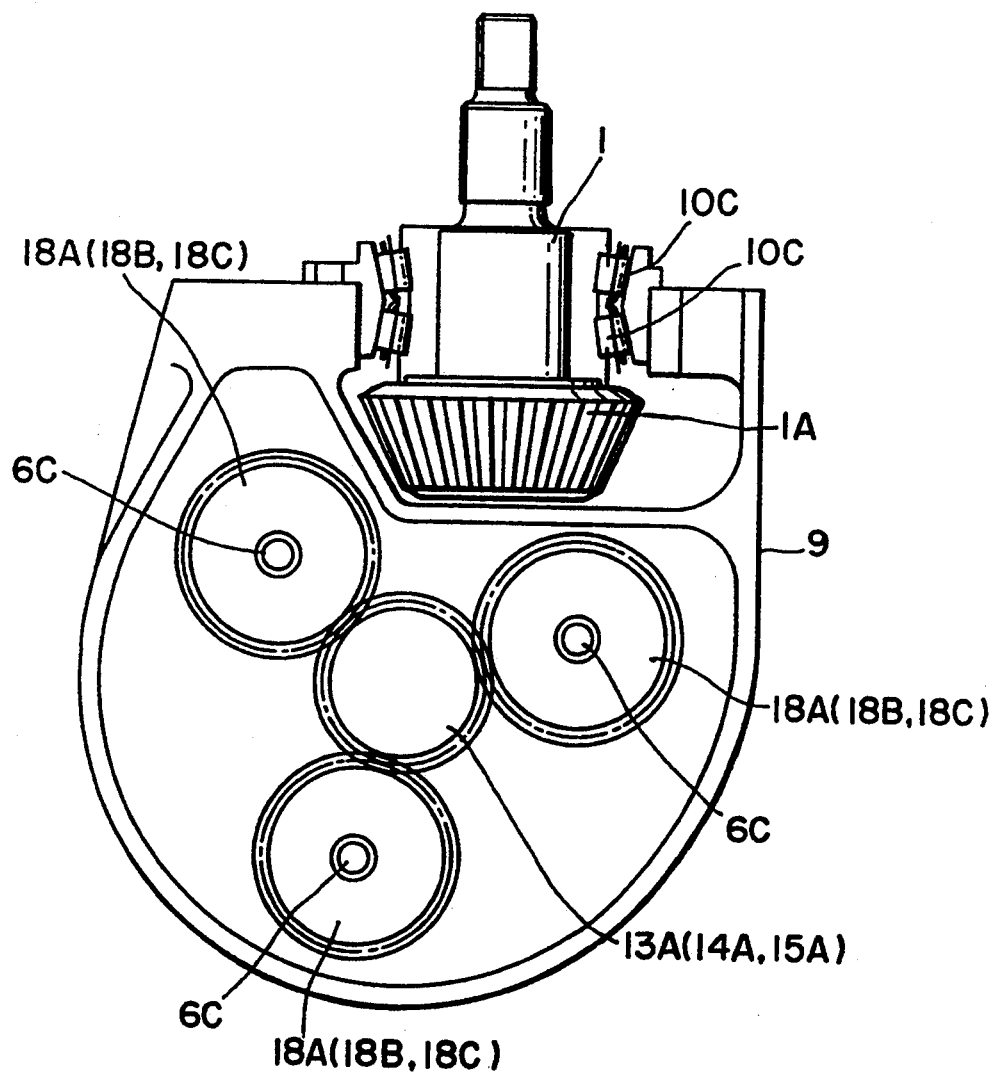
FIG. 3 is a substantially vertical, cross-sectional view showing the layout of a speed increasing/decreasing mechanism in the vehicular left/right drive torque adjusting apparatus according to one embodiment of the present invention.

Namely, as illustrated in FIG. 3, plural (three in the illustrated embodiment) fixed planetary shafts 6C are disposed around the right-wheel axle 3 in a phase shifted from the hypoid pinion 1A. On each of these planetary shafts 6C, a compound planetary pinion 6D provided with three kinds of gears 18A,18B,18C is supported for rotation.

To be rotatable in mesh with the individual gears 18A,18B,18C of the compound planetary pinion 6D, there are mounted a gear (sun gear) 13A on the intermediate axle 13, another gear (sun gear) 14A on the intermediate axle 14 and a further gear (sun gear) 15A on the intermediate axle 15, respectively.

These gears 13A,14A,15A are set to satisfy the relationship expressed by the following inequality: $Z_1 < Z_2 < Z_3$ where $Z_1$, $Z_2$ and $Z_3$ are the numbers of teeth of the gears 13A,14A,15A, respectively. On the other hand, the gears 18A,18B,18C are set to satisfy the relationship expressed by the following inequality: $Z_6 < Z_4 < Z_5$ where $Z_4$, $Z_5$ and $Z_6$ are the numbers of teeth of the gears 18A,18B,18C, respectively.

The speed increasing mechanism 6A is constructed of the combination of the gears 13A,18A,18B,14A, while the speed decreasing mechanism 6B is constructed of the combination of the gears 13A,18A,18C,15A.

When rotation of the intermediate axle 13 is transmitted to the intermediate axle 14 along a path which extends through the gears 13A, 18A, 18B and 14A successively in the speed increasing mechanism 6A, the intermediate axle 14 rotates at a higher speed than the intermediate axle 13 because of the ratio of the number of teeth of the respective gears. When rotation of the intermediate axle 13 is transmitted to the intermediate axle 15 along a path which extends through the gears 13A, 18A, 18C and 15A successively in the speed decreasing mechanism 6B, on the other hand, the intermediate axle 15 rotates at a lower speed than the intermediate axle 13 because of the ratio of the number of teeth of the respective gears.

An output of the speed increasing/decreasing mechanism 6 of such a construction as described above is inputted to the side of the coupling 7 or 8 via the intermediate axle 14 or 15.

The intermediate axles 13,14,15 are rotatably supported via the fixed planetary shaft 6C, planetary pinion 6D and sun gears 13A,14A,15A.

The first and second couplings 7,8, which are electronically controlled, hydraulic multi-plate clutch mechanisms, are arranged as an integral unit in the space 9C of the differential carrier 9 as described above. It is to be noted that these couplings 7,8 are arranged outside the speed increasing/decreasing mechanism 6. This arrangement facilitates a dimensional reduction and oil control of the apparatus.

The respective couplings 7,8 are provided with clutch plates 7A,8A integrally rotatable with the right-wheel axle 3, clutch plates 7B,8B integrally rotatable with the intermediate axles 14,15, respectively, and hydraulic pistons 7C,8C for applying clutch pressure to these clutch plates 7A,7B,8A,8B. By electronic control through an unillustrated controller, the drive hydraulic pressures of the hydraulic pistons 7C,8C are regulated by hydraulic pressure feed/drain systems 7D,8D, respectively so that the state of engagement or contact between the clutch plates 7A and 7B or 8A and 8B, that is, the state of transmission of torque can be adjusted. Designated at 7E,8E are return springs.

When the coupling 7 is caused to engage by control through the controller, drive torque is transferred from the side of the intermediate axle 14 rotating at a high speed during usual running other than prompt turning, to the right-wheel axle 3, namely, from the side of the left-wheel axle 2 to the side of the right-wheel axle 3. As a result, the drive torque for the right-wheel becomes greater than that for the leftwheel.

When the coupling 8 is conversely caused to engage by control through the controller, drive torque is transferred from the side of the right-wheel axle 3 to the side of the intermediate axle 15 rotating at a lower speed than the right-wheel axle 3, that is, from the side of the right-wheel axle 3 to the side of the left-wheel axle 2 during normal running other than quick turning. As a consequence, the drive torque for the left wheel becomes greater than that for the right wheel.

As is evident from the foregoing, the apparatus of this embodiment makes use of the principle that torque is transmitted from a faster side to a slower side in a slip clutch or the like.

FIGS. 1 and 2 also show needle bearings 10B, roller bearings 10C, and the oil seals 10D.

Since the vehicular left-right drive torque adjusting apparatus according to the one embodiment of this invention is constructed as described above, actuation of the couplings 7,8 as desired under the control of the controller makes it possible to transfer drive torque between the left and right wheels. By making drive torques for the left and right wheels uneven, for example, a turning moment can be developed to improve the turning performance of the vehicle. By performing control so that drive torques for the left and right wheels can be balanced conversely, it is possible to improve the straight running performance of the vehicle.

Moreover, the distribution of torque is adjusted by transferring a desired amount of torque of one of the left and right wheels to the other wheel instead of adjusting the torque distribution by using an energy loss such as braking. It is therefore possible to achieve distribution of torque at a desired ratio without inducing any substantial torque loss or energy loss.

In the apparatus of the present embodiment, the couplings 7,8 are arranged via the intermediate axles 13–15. This arrangement requires a smaller coupling capacity, thereby making it possible to reduce the dimensions of the apparatus.

Further, a change-over switch for the direction of control has been omitted so that drive torque is transmitted directly to each of the couplings 7,8 from the speed increasing/decreasing mechanism 6. This has led to substantial improvements in control responsibility.

The rear differential 4 is constructed of the planetary differential of the double pinion type, and the speed increasing/decreasing mechanism 6 constructed of the integral unit of the speed increasing mechanism 6A and the speed decreasing mechanism 6B is disposed. It is hence possible to arrange all the mechanisms on a common axis.

The input shaft 1 and the speed increasing/decreasing mechanism 6 are arranged substantially along the base line 19, and the differential mechanism 4 and the first and second couplings 7,8 of the variable transmitted torque capacity type are disposed on the opposite sides of the base line, respectively. This can facilitate the layout of the partition 16 and the partition 17. As a result, the gears and the multiplate clutch, which use different oils, can be separated, leading to the advantages that the apparatus can be constructed compact and the control of the oils can be facilitated.

The compound planetary gear mechanism is used as the speed increasing/decreasing mechanism 6. Owing to the self-centering effect of the gears, the axes of the intermediate axles 13,14,15 are automatically registered with each other and reaction forces developed upon meshing engagement of the gears can be canceled out. The speed increasing/decreasing mechanism 6 can therefore be operated stably.

The parallel dual-axes type which makes use of a countershaft requires bearings having sufficient stiffness. Such bearings are no longer required for the compound planetary gear mechanism, thereby making it possible to proceed with a further dimensional reduction in mechanism.

It is however to be noted that the use of such a compound planetary gear mechanism as the speed increasing/decreasing mechanism 6 is not absolutely essential. The speed increasing/decreasing mechanism 6 can, for example, be of the above-mentioned parallel dual-axes type which makes use of a countershaft.

Figure 4:
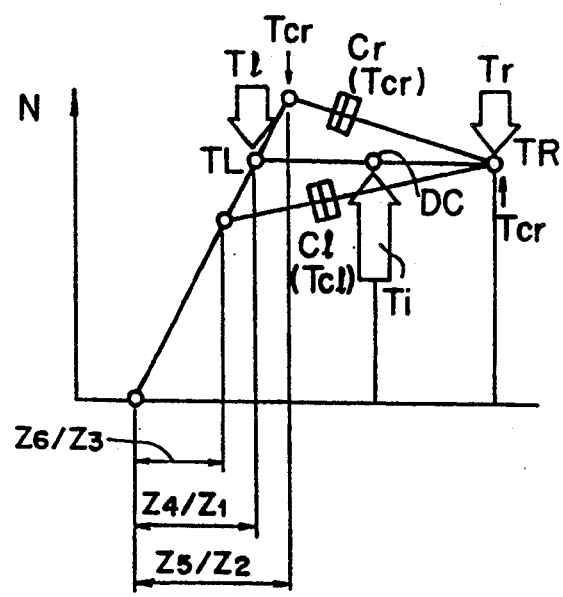
FIG. 4 is a speed diagram depicting a relationship in speed among certain essential elements in the vehicular left/right drive torque adjusting apparatus according to one embodiment of the present invention during straight running.
Figure 5:
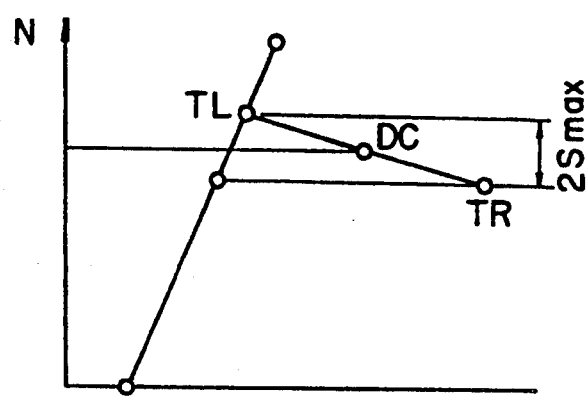
FIG. 5 is a speed diagram showing a relationship in speed among the essential elements in the vehicular left/right drive torque adjusting apparatus according to one embodiment of the present invention during rightward turning.
Figure 6:
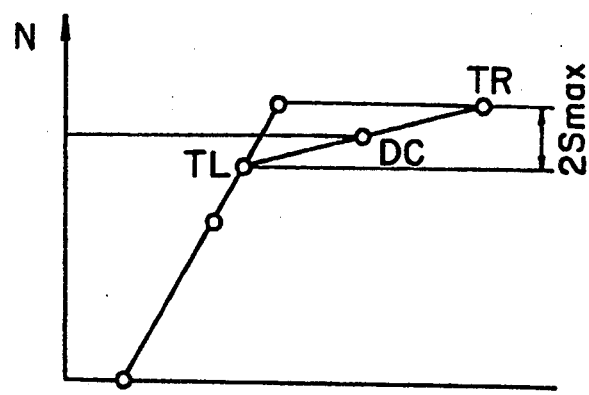
FIG. 6 is a speed diagram showing a relationship in speed among the essential elements in the vehicular left/right drive torque adjusting apparatus according to one embodiment of the present invention during leftward turning.

In the apparatus of the present embodiment, a relationship in speed among a rotational speed on the side of the input means, an output on the side of the right wheel and an output on the side of the left wheel can be illustrated as shown in FIGS. 4 to 6. FIG. 4 shows respective speeds when both the couplings 7,8 are made completely free (or released), FIG. 5 illustrates respective speeds during rightward turning, and FIG. 6 depicts respective speeds during leftward turning.

In the individual diagrams, Ti represents input torque to the differential case 10, Tl and Tr torques distributed to the right and left wheels, respectively, Tcr torque transmitted rightwards when the coupling on the side of the right wheel is caused to engage, and Tcl torque transmitted leftward when the coupling on the side of the left wheel is caused to engage. There are also shown a rotational speed DC of the differential case 10, a rotational speed TR on the side of the right wheel, and a rotational speed TL on the side of the left wheel.

A discussion will next be made on the setting of the planetary gear in the vehicular left/right drive torque adjusting apparatus, a relational formula of torque distribution, an energy loss and a torque loss.

(1) Setting of the planetary gear:

A left-to-right differential shift ratio S can be expressed by the following formula:

$$S = (V_r - V_{DC})V_{DC}$$

where $V_{DC}$: rotational speed of the differential case 10 ($= V_{in}$: rotational speed of an input shaft).

$V_r$: rotational speed of the right-wheel axle 3.

Assuming that the left-to-right differential shift ratio during critical turning (turning in which the speed increasing or decreasing function of the speed increasing/decreasing mechanism 6 is maintained) is Smax (hereinafter abbreviated as "Sm"), $$Z_6/Z_3 \cdot Z_4/Z_1 = (1 - Sm):(1 + Sm)$$
$$\therefore (Z_3 \cdot Z_4)/(Z_1 \cdot Z_6) = (1 + Sm)/(1 - Sm) \quad (1.1)$$

$$Z_4/Z_1 \cdot Z_5/Z_2 = (1-Sm):(1+Sm)$$
$$\therefore (Z_1 \cdot Z_5)/(Z_2 \cdot Z_4) = (1+Sm)/(1-Sm) \tag{1.2}$$

From the above formulae (1.1) and (1.2), $$(Z_3 \cdot Z_4)/(Z_1 \cdot Z_6) = (Z_1 \cdot Z_5)/(Z_2 \cdot Z_4) \tag{1.3}$$

If $Z_1 = Z_4$, the formula (1.3) can be simplified to:

$$Z_3/Z_6 = Z_5/Z_2 = (1+Sm)/(1-Sm) \tag{1.4}$$

Setting of the planetary gear can be conducted as described above.

(2) The relational formula of torque distribution is next derived.

In the following discussion, Ti represents input torque to the differential case 10, Tl and Tr torques distributed to the right and left wheels, respectively, Tcr torque transmitted rightwards when the coupling on the side of the right wheel is caused to engage, and Tcl torque transmitted leftward when the coupling on the side of the left wheel is caused to engage.

(i) Upon engagement of the right-side coupling R (which is designated by numeral 7 in the embodiment); From the formula of equilibrium of the differential gear, $$Ti = (Tl + (Z_5 \cdot Z_1/Z_2 \cdot Z_4)Tcr) + (Tr - Tcr)Tl + (Z_5 \cdot Z_1/Z_2 \cdot Z_4/Tcr = (Tr - Tcr) \tag{2.1}$$

From formulae (1.2) and (2.1), the torques of the left and right wheels can be expressed as follows:

$$Tl = 0.5\ Ti - [(1+Sm)/(1-Sm)]Tcr$$

$$Tr = 0.5\ Ti + Tcr \tag{2.2}$$

The amount ($\Delta T$) of torque to be transferred is $$\Delta T = Tr - Tl = [2/(1-Sm)]Tcr \tag{2.3}$$

The coupling torque Tcr needed for the transfer of the amount ($\Delta T$) of torque is then given by the following formula:

$$Tcr = [(1-Sm)/2]\Delta T \tag{2.4}$$

(ii) Upon engagement of the left-side coupling L (which is designated by numeral 8 in the embodiment): From the formula of equilibrium of the differential gear, $$Ti = (Tl - (Z_1 \cdot Z_6/Z_4 \cdot Z_3)Tcl) + (Tr + Tcl)Tl - (Z_1 \cdot Z_6/Z_4 \cdot Z_3/Tcl = (Tr - Tcl) \tag{2.5}$$

From formulae (1.2) and (2.5), the torques of the left and right wheels can be expressed as follows:

$$Tl = 0.5\ Ti + [(1-Sm)/(1+Sm)]Tcl$$

$$Tr = 0.5\ Ti - Tcl \tag{2.6}$$

The amount ($\Delta T$) of torque to be transferred is $$\Delta T = Tr - Tl = -[2/(1+Sm)]Tcl \tag{2.7}$$

The coupling torque Tcr needed for the transfer of the amount ($\Delta T$) of torque is then given by the following formula:

$$Tcl = [(1+Sm)/2](-\Delta T) \tag{2.8}$$

Distribution of torque can be calculated in the manner as described above.

(3) Energy loss (i.e., energy momentarily absorbed in the clutch) per unit time, $\Delta E$, will next be determined.

Energy loss will be discussed under conditions that make the left-to-right differential shift ratio S satisfy the following inequality:

$$|S| < Smax \tag{3.1}$$

In the following discussion, the slip speed ratio of the coupling R will be represented by Scr while that of the coupling L will be designated by Scl.

(i) With respect to the right-side coupling R (which is designated by numeral 7 in the embodiment), $$Z_4/Z_1 \cdot Z_5/Z_2 = (1-S) \cdot X$$
$$\therefore X = (Z_5 Z_1/Z_2 Z_4) \cdot (1-S)$$
$$= [(1-Sm)/(1+Sm)] \cdot (1-S)$$

Accordingly, $$Scr = [(1+Sm)/(1-Sm)] \cdot (1-S) - (1+S) \tag{3.2}$$
$$= [2/(1-Sm)](Sm - S)$$

Energy loss $\Delta E$ can thus be given by the following formula:

$$\Delta E = Tcr \cdot Scr \cdot \omega_{DC} \tag{3.3}$$
$$= (Sm - S) \cdot \Delta T \cdot \omega_{DC}$$

where $\omega_{DC}$: rotational speed of differential case (rad/s).

(ii) With respect to the left-hand coupling L (which is designated by numeral 8 in the embodiment), $$Z_4/Z_1 \cdot Z_6/Z_3 = (1-S) \cdot X$$
$$\therefore X = (Z_6 Z_1/Z_3 Z_4) \cdot (1-S)$$
$$= [(1+Sm)/(1-Sm)] \cdot (1-S)$$

Accordingly, $$Scl = (1+S) - [(1-Sm)/(1+Sm)] \cdot (1-S) \tag{3.4}$$
$$= [2/(1+Sm)](Sm + S)$$

Energy loss $\Delta E$ can thus be given by the following formula:

$$\Delta E = Tcl \cdot Scl \cdot \omega_{DC} \tag{3.5}$$
$$= (Sm + S) \cdot (-\Delta T) \cdot \omega_{DC}$$

(4) Torque loss TL (TL:input torque > output torque) will next be determined.

(i) Upon engagement of the right-side coupling R (which is designated by numeral 7 in the embodiment):

$$TL = Ti - (Tr + Tl) \tag{4.1}$$
$$= [(1+Sm)/(1-Sm) - 1]Tcr$$

(ii) Upon engagement of the left-side coupling L (which is designated by numeral 8 in the embodiment):

$$TL = Ti - (Tr + Tl) \qquad (4.2)$$
$$= [1 - (1 - Sm)/(1 + Sm)]Tcl$$

Upon setting the apparatus of the embodiment, its characteristics can be studied for example in the manner described above.

What is claimed is:

1. A vehicular left/right drive torque adjusting apparatus having, between a left-wheel axle and a right-wheel axle in a vehicle, input means for receiving drive torque from an engine, a differential mechanism for transmitting drive torque, which has been inputted from said input means, to the left-wheel axle and the right-wheel axle while permitting differential motion between the left-wheel axle and the right-wheel axle, and a drive torque transmission control mechanism for controlling the state of transmission of the drive torque to permit adjustment of the distribution of the drive torque to the left and right wheels, characterized in that the drive torque transmission control mechanism comprises:

a speed increasing/decreasing mechanism interposed between the left-wheel axle and the right-wheel axle and constructed integrally of a speed increasing mechanism and a speed decreasing mechanism, said speed increasing mechanism being adapted to increase a rotational speed of one of the axles and then to output the thus-increased rotational speed to a first intermediate axle, and said speed decreasing mechanism being adapted to decrease a rotational speed of said one axle and then to output the thus-decreased rotational speed to a second intermediate axle;

a first coupling of the variable transmitted torque capacity type interposed between the first intermediate axle and the other axle and adapted to transmit drive torque between the first intermediate axle and the other axle; and a second coupling of the variable transmitted torque capacity type interposed between the second intermediate axle and the other axle and adapted to transmit drive torque between the second intermediate axle and the other axle.

2. An apparatus of claim 1, wherein the first and second couplings of the variable transmitted torque capacity type are adjacent to each other and are integrally constructed as an integral coupling; and the differential mechanism, the speed increasing/decreasing mechanism and the integral couplings are arranged coaxially.

3. An apparatus of claim 2, wherein the first and second couplings of the variable transmitted torque capacity type are constructed as electrically-controlled, hydraulic multi-plate clutches, respectively; and the electrically-controlled, hydraulic multi-plate clutches are integrated in series to form the integral coupling.

4. An apparatus of claim 2, wherein the integral coupling is disposed with a partition interposed between the integral coupling and the differential mechanism and speed increasing/decreasing mechanism.

5. An apparatus of claim 2, wherein the differential mechanism is constructed of a planetary differential mechanism.

6. An apparatus of claim 5, wherein the planetary differential mechanism comprises a ring gear, a planetary carrier and a sun gear, the ring gear is connected to said input means so that the ring gear integrally rotates with said input means, the planetary carrier is connected to one of the axles so that the planetary carrier integrally rotates with the one axle, the sun gear is connected to the other axle so that the sun gear integrally rotates with the other axle, the one axle and the other axle are coaxially arranged on left and right sides of the planetary differential mechanism, respectively, the speed increasing/decreasing mechanism is arranged on the side of the other axle, and the integral coupling is arranged outside the speed increasing/decreasing mechanism on the side of the other axle.

7. An apparatus of claim 6, wherein a third intermediate axle is interposed between the one axle and the speed increasing/decreasing mechanism to connect the one axle and the speed increasing/decreasing mechanism to each other via the third intermediate axle, the speed increasing mechanism of the speed increasing/decreasing mechanism is constructed of a gear mechanism interposed between the third intermediate axle and the first intermediate axle, and the speed decreasing mechanism of the speed increasing/decreasing mechanism is constructed of a gear mechanism interposed between the third intermediate axle and the second intermediate axle.

8. An apparatus of claim 1, wherein the speed increasing/decreasing mechanism is constructed of a compound planetary gear mechanism in which an input sun gear integrally rotatable with a third axle, a first output sun gear integrally rotatable with the first intermediate axle, a second output sun gear integrally rotatable with the second intermediate axle, an input planetary gear rotatable in mesh with the input sun gear, and a first output planetary gear rotatable in mesh with the first output sun gear and a second output planetary gear rotatable in mesh with the second output sun gear are integrally connected together.

9. An apparatus of claim 8, wherein the first and second couplings of the variable transmitted torque capacity type are adjacent to each other and are integrally constructed as an integral coupling; and the differential mechanism, the speed increasing/decreasing mechanism and the integral couplings are arranged coaxially.

10. An apparatus of claim 1, wherein the differential mechanism and the speed increasing/decreasing mechanism are accommodated within a differential carrier so that the differential mechanism and the speed increasing/decreasing mechanism are isolated from each other by a partition.

11. An apparatus of claim 1, wherein the input means and the speed increasing/decreasing mechanism are arranged substantially along an imaginary base line which extends in a front-to-rear direction of the vehicle; and the differential mechanism is arranged on one side of the imaginary base line, and the first and second couplings of the variable transmitted torque capacity type are arranged on the opposite side of the imaginary base line.

* * * * *